Sept. 1, 1925.
L. E. ROBY
1,551,584
COMBINED SEEDING AND HARROWING DEVICE
Filed May 13, 1922
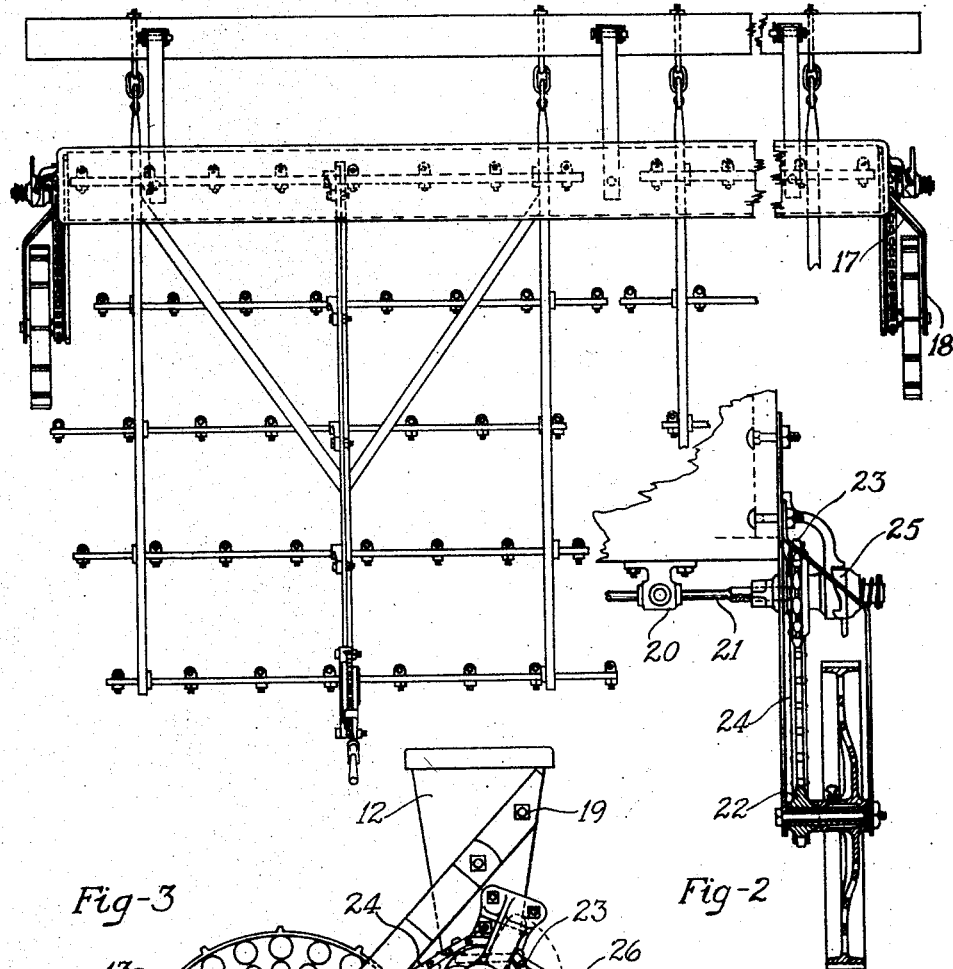
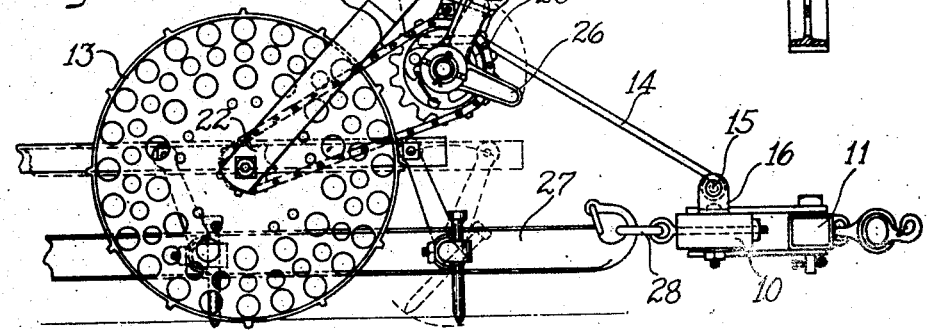
Witnesses
Chas. A. Barnett
Inventor.
Luther E. Roby
By Tifft & Tifft
Attorney Patented Sept. 1, 1925.

1,551,584

UNITED STATES PATENT OFFICE.

LUTHER E. ROBY, OF PEORIA, ILLINOIS.

COMBINED SEEDING AND HARROWING DEVICE.

Application filed May 13, 1922. Serial No. 560,527.

*To all whom it may concern:*

Be it known that I, LUTHER E. ROBY, a citizen of the United States of America, residing at Peoria, in the county of Peoria and State of Illinois, have invented certain new and useful Improvements in Combined Seeding and Harrowing Devices, of which the following is a specification.

My invention relates to seeding mechanisms or more particularly to a unitary structure combining a seeding and harrowing device.

The object of my invention is in the provision of a combined seeding and harrowing device, whereby the particular arrangement of parts and supports therefor, result in a simple and efficient structure.

Another object of my invention is in the provision of a unitary structure combining a seeding mechanism and a harrow, whereby, said device, due to its peculiar combination of supports, is capable of maintaining itself in a position to be attached either to the customary eveners or to any draft mechanism.

Further objects of my invention will appear in the following specification in connection with the annexed drawings, in which:

Figure 1, is a plan view, partially broken away.

Figure 2, is a rear elevation showing in detail the connection between the traction wheels and seeding mechanism.

Figure 3, is a side elevation of the device.

Referring to the drawings, in Figure 3, there is a complete showing of the arrangement and location of the operating portions of my combined seeder and harrowing device.

10 refers to a supporting bar, which is capable of attachment, by means of a draft member 11 or other equivalent means, to a team of horses or some power operated draft means. A seed hopper 12 or really a plurality of seed hoppers, is disposed rearwardly of the draft bar and slightly in advance of the traction wheels 13. Means for supporting the seed hopper in this manner is accomplished by the forwardly extending braces 14, attached to the draft bar at 15 or rather, to brackets 16 in connection therewith. The rear ends of said braces 14 are angled slightly in order to engage and to be firmly attached to the lower side of said hopper. 17 are furcated bracket members fixed to the seed hopper and extending rearwardly thereof and embracing traction wheels 13, the latter being journaled upon the pin members 18, which connect the lower ends of said furcated bracket members.

It may be seen from the above that by the particular manner of locating the various elements, a unitary seeding structure is produced. The seeding hopper or rather the plurality of seeding hoppers have the discharge spouts 20 of formal construction, and the seed delivery mechanism, is operated by the horizontally disposed shaft 21. Means for transmitting power from the traction wheels to the seed delivery shaft 21, is provided in the spockets 22 and 23 and the chain 24. A simple and quietly operating clutching mechanism, described generally as 25, is disposed at either end of the seed hopper and is capable of throwing into or out of operative relation with the traction wheels, the seed delivery shaft 21.

Inasmuch as many simple clutching mechanisms other than the one shown in mine, may well be used in this connection, I have not thought it necessary to describe it in detail other than to say that by movement of the lever 26, clutching or unclutching relation of the sprocket 23 with the seed delivery shaft 21, results.

In Figure 3, the particular mounting of the harrow, described generally as 27, with relation to the draft bar 10 and seeding mechanism, is shown, the connection with the draft bar being made in any suitable manner, my specific arrangement being shown at 28.

Description of the detailed operation of my combined seeding and harrowing device is hardly thought necessary in view of the above description but it might be said that, due to the rigid supports for the seeding mechanism, in connection with the traction wheels and supporting bar, there is an absolute insurance of seed delivery at all times, besides the fact that my particular location and arrangement of the various elements result in a simple unitary and practicable device.

What I claim is:

A seeding and harrowing device having in combination, a harrow, a seed container extending substantially the width of the harrow superposed above and located at the front end of the harrow, a driven member for controlling the distribution of seed from the container, supporting brackets rigidly secured at the upper end to the container and extending downwardly and rearwardly therefrom, traction members on each side of the harrow, journals for said traction members mounted in the lower end of said brackets, means for driving the said driven member from a traction member, draft means, means connecting the container to the draft means, and means connecting the harrow to said draft means.

In testimony whereof I affix my signature.

LUTHER E. ROBY.